UNITED STATES PATENT OFFICE.

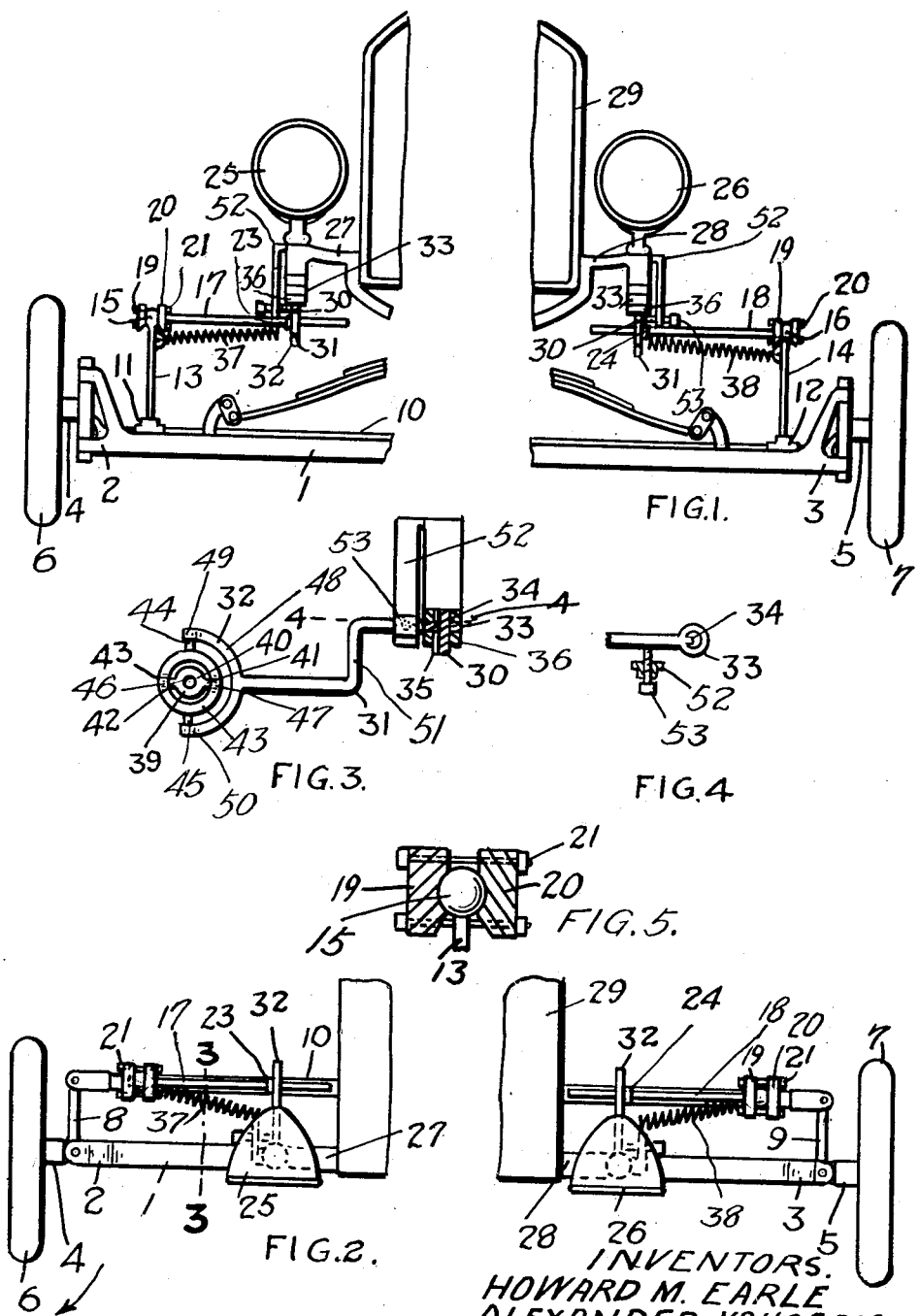

HOWARD MILTON EARLE, ALEXANDER VAUGEOIS, AND FRED CARSTON, OF DRUID, SASKATCHEWAN, CANADA.

LIGHT-DIRECTOR.

1,370,795.  Specification of Letters Patent.  Patented Mar. 8, 1921.

Application filed May 10, 1920. Serial No. 380,333.

*To all whom it may concern:*

Be it known that we, HOWARD MILTON EARLE, a subject of the King of Great Britain, ALEXANDER VAUGEOIS, a citizen of the United States, and FRED CARSTON, a citizen of the United States, all residing at Druid, in the Province of Saskatchewan, Canada, have invented certain new and useful Improvements in Light-Directors, of which the following is the specification.

Our invention relates to improvements in light directors for automobiles, and the object of the invention is to provide means for automatically turning the head lights of a car as a car passes around a curve so that the rays of light will cover the whole path of travel of the machine in a similar way as it does when the automobile is traveling directly ahead, and it consists essentially of the arrangement and construction of parts as hereinafter more particularly explained.

Figure 1 is a front elevation of an automobile intermediately broken away of its width and showing our light directing device applied thereto.

Fig. 2 is a plan view of the part shown in Fig. 1.

Fig. 3 is an enlarged sectional detail of the head light turning mechanism taken on line 3—3, Fig. 2.

Fig. 4 is a sectional plan view taken on line 4—4, Fig. 3.

Fig. 5 is a sectional detail of a ball and socket connection employed in our device.

In the drawings like characters of reference indicate corresponding parts in each figure.

1 indicates the front axle of an automobile provided with the usual forked ends 2 and 3 in which are journaled the spindle bodies 4 and 5 according to common practice and on the spindles of which are mounted the front wheels 6 and 7 of the automobile. 8 and 9 indicate the spindle arms extending rearwardly from the spindle body which arms are connected together by the distance rod 10. 11 and 12 are sleeves secured upon the distance rod in proximity to each spindle arm 8 and 9. 13 and 14 indicate rods which are rigidly secured at their lower ends to the sleeves 11 and 12. 15 and 16 indicate balls formed on the rods 13 and 14 at their upper end. 17 and 18 indicate rods, each provided with socket members 19 and 20 in which the ball ends of the vertical rods 13 and 14 fit. The socket members 19 and 20 are secured together thereon by means of bolts 21. The rods 17 and 18 are provided intermediately of their length with adjustable enlargements 23 and 24. 25 and 26 indicate the head lights. 27 and 28 indicate arms extending from each side of the radiator 29 of the automobile and which form the bearing supports for the vertical spindles 30 of the head lights. These spindles are supported in the usual manner which is common practice and may be provided with ball bearings to allow of their free turning movement within the arms 27 and 28. 31 indicate rods which are provided at their outer ends each with a universal joint 32 for connecting them to the rods 17 and 18. The construction of this universal joint connection is hereinafter described. The opposite end of each rod 31 is provided with an eye 33 having an internal tongue 34 extending into a key groove 35 formed in each spindle 30. The eyes 33 are secured in position by a securing nut 36. 37 and 38 indicate tension springs connecting the rods 31 to the rods 17 and 18. The universal joints 32 comprise a center member 39 which is in the form of a disk provided with a central perforation 40 through which the rod 17 or 18 slidably extends, the enlargement 23 and 24 of the rods 17 and 18 bearing against the outer face of each disk 39. The disk 39 is also provided with trunnions 41 and 42 extending from the diametrically opposite joints in a horizontal direction. 43 indicates an annular member provided with trunnions 44 and 45 extending in a vertical direction and with bearings 46 and 47 over the trunnions 41 and 42. 48 is a fork provided with end bearings 49 and 50 for the trunnions 44 and 45. The rods 31 are offset intermediately of their length at 51, the opposite end of the rod being provided with the eye 33 hereinbefore described. 52 is an arm depending from each bearing arm 27 and 28. 53 is an adjustable screw extending through each arm 52 and with which the rod 51 contacts when in the normal position. Having described the principal parts in our invention we will briefly describe the operation of the same. When the car is driving straight ahead it assumes the position shown in the drawing. When the car is turned in the right or the direction indicated by the arrow, the distance rod is thrown in the opposite direction to the arrow as the front wheel 6 swings in a rearward direction. By this movement of the distance rod 10, the rods 13 and 14 are carried in a corresponding direction, the rods 17 and 18 being carried thereby and the enlargement 23 of the rods 17 and 18 against the center member or disk 39 of the universal coupling of the left hand rod 31. The enlargement 24 by the same operation is simultaneously carried away from the center member of the universal coupling of the rod 31 on the right hand side of the machine. The pressure of the enlargement 23 against the center member 39 of the left hand coupling swings the rear end of the rod 31 in an inward direction so that the head light 25 which is controlled thereby is swung into a position to direct its rays outward from the car so as to widen the light field to follow the direction which the car is taking around the curve. The head light 26 is stationary during this operation for the reason that the enlargement 24 as above described merely draws away from the center member 39 of the coupling at the right hand side of the machine. When the car is turning in the opposite direction to the arrow the reverse of the above operation takes place, that is to say, the enlargement 23 draws away from the center coupling member on the left hand side of the machine and the enlargement 24 bears against the center coupling member on the right hand side of the machine so as to turn the head light 26 to direct its rays outward, the head light 25 being unaffected by this operation. It will be readily seen that when the enlargement 23 is drawn away from the center member of the universal joint, that the stop screw serves to positively hold the rod 31 of the left hand side of the machine from moving outward. Similarly when the enlargement 24 draws away from the center member of the right hand universal coupling the stop screw prevents the outward movement of the left hand rod 31. When the enlargements 23 and 24 are drawn away from the coupling member the springs 37 and 38 are pulled into tension and serve to carry the parts back to their normal position when the car again moves in the straight ahead direction.

From this description it will be seen that we have devised a very simple device whereby the head lights of an automobile may be directed so as to increase the field of view of the driver so that he has a clear view directly ahead of the wheels no matter in what position they are turned and in what direction they are traveling.

What we claim as our invention is—

In an automobile, the combination with the distance rod and bearing brackets located at each side of the car and a head light spindle journaled in each of such brackets, of standards extending upward from each end of the distance rod, an arm extending from each headlight spindle, a rod extending horizontally from each standard and having a ball and socket connection thereto, a gimbal joint carried by the arm extending from the headlight spindle and through the center of which the aforesaid rods freely extend, a shoulder on each of said rods, a spring for holding such shoulder against the central portion of the gimbal, a bracket extending from each headlight spindle bearing bracket and located on the outer side thereof, and a set screw extending through such bracket against the outer side of the headlight spindle arm.

HOWARD MILTON EARLE.
ALEXANDER VAUGEOIS.
FRED CARSTON.